May 25, 1943.  D. I. WILSON ET AL  2,319,963

MANUALLY OPERATED SCREW MACHINE

Filed June 29, 1942  5 Sheets-Sheet 1

INVENTORS
DELBERT I. WILSON
BY JOHN W. QUINN

ATTORNEYS

May 25, 1943.  D. I. WILSON ET AL  2,319,963

MANUALLY OPERATED SCREW MACHINE

Filed June 29, 1942  5 Sheets-Sheet 2

INVENTORS
DELBERT I. WILSON
BY JOHN W. QUINN
Toulmin & Toulmin
ATTORNEYS

May 25, 1943.    D. I. WILSON ET AL    2,319,963
MANUALLY OPERATED SCREW MACHINE
Filed June 29, 1942    5 Sheets-Sheet 3

INVENTORS
DELBERT I. WILSON
BY JOHN W. QUINN
ATTORNEYS

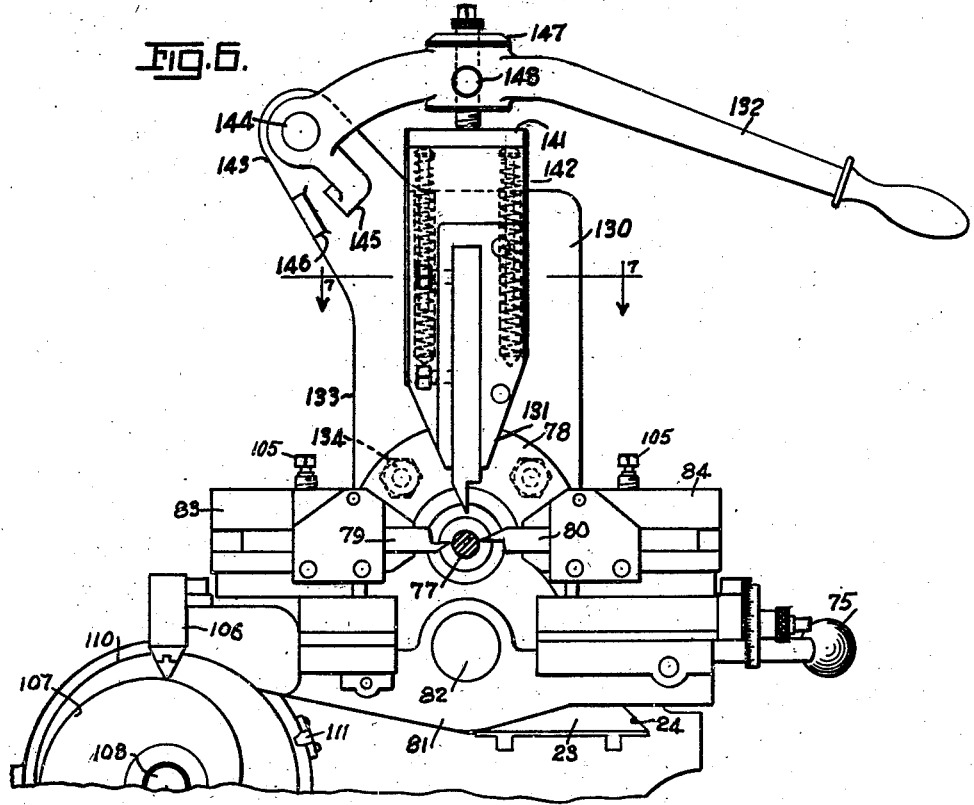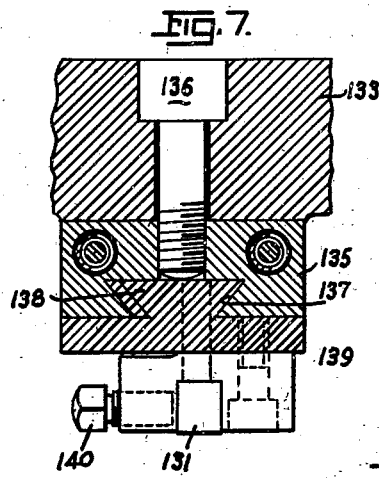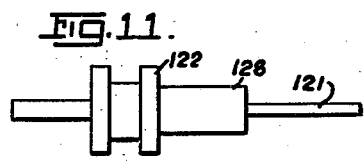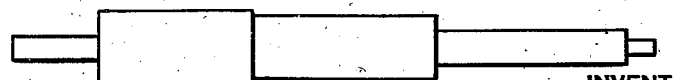

May 25, 1943.  D. I. WILSON ET AL  2,319,963
MANUALLY OPERATED SCREW MACHINE
Filed June 29, 1942   5 Sheets-Sheet 5

INVENTORS
DELBERT I. WILSON,
JOHN W. QUINN,
BY
ATTORNEYS

Patented May 25, 1943

2,319,963

UNITED STATES PATENT OFFICE 2,319,963

MANUALLY OPERATED SCREW MACHINE

Delbert I. Wilson and John Wesley Quinn, Dayton, Ohio, assignors to The City Engineering Company, Dayton, Ohio, a corporation of Ohio Application June 29, 1942, Serial No. 448,900

17 Claims. (Cl. 82—2)

This invention relates to an improved hand-operated turning machine that is adapted to drive the work stock and to move the same with respect to the turning tools for producing accurately dimensioned workpieces.

Hand-operated turning machines have heretofore required that the work stock should be suitably chucked upon a spindle and the free end of the stock be centered upon a dead center. This is true particularly when turning workpieces of any substantial length. However, it has been extremely difficult to chuck and center workpieces of small diameter, workpieces having small diameter and long length have been extremely troublesome in their manufacture upon turning machines of the conventional type.

An object of this invention is to provide a hand-operated turning machine that is capable of producing a workpiece of any diameter up to the maximum size capable of being placed within the machine, and of any length, dependent only upon the stock available.

Another object of the invention is to provide a hand-operated turning machine wherein the work stock is moved longitudinally with respect to the work tools, and is continuously supported immediately adjacent the turning tools.

Another object of the invention is to provide a hand-operated turning machine wherein the turning tools are movable transversely with respect to the live spindle of the machine, and the work stock is moved by the spindle with respect to the tools longitudinally thereof to turn pieces of desired length.

Another object of the invention is to provide a hand-operated turning machine wherein the live spindle of the machine is moved with respect to the work tools and is adapted to carry the stock therewith for longitudinal movement of the stock with respect to the tools, and the work tools are moved transversely with respect to the spindle by means of a constant rise cam that is provided with calibrations for determining the degree of transverse movement of the turning tools.

Another object of the invention is to provide a hand-operated turning machine wherein the work stock is moved longitudinally with respect to the work tools, and the work tools are moved transversely with respect to the work stock, the movements being associated with one another so that an article of predetermined configuration can be produced by the work tools merely upon regulating the longitudinal movement of the work stock.

Another object of the invention is to provide a turning machine wherein the work stock is continuously supported immediately adjacent the work tools regardless of the portion of the article that is being worked upon by the work tools.

It is another object of the invention to provide a hand-operated turning machine wherein the work tools are movable transversely with respect to the work stock, and are controlled in their transverse movement by means of a constant rise cam or other mechanism capable of producing a constant transverse movement of the work tools for a predetermined motion of the hand operated controls.

It is another object of the invention to provide a turning machine wherein the work tools are movable radially with respect to the axis of spindle for turning stock carried thereby, and are controlled by means of a constant rise cam calibrated to inform the operator of the machine as to the diameter being cut by the work tool, and wherein the work stock is moved longitudinally with respect to the work tools by means of the spindle which drives the work stock for longitudinal turning and controlling the longitudinal turning by means of a calibrated control apparatus that regulates the longitudinal movement of the spindle with respect to the work tools.

It is another object of the invention to provide a hand-operated turning machine wherein the work stock is carried by a live spindle and is moved longitudinally thereby with respect to the turning tools, and wherein mechanism is provided for controlling the speed of rotation of the spindle as well as the longitudinal movement thereof for thread cutting.

It is another object of the invention to provide a hand-operated turning machine wherein the work stock is moved longitudinally with respect to a drilling or boring tool so that the point of drill engagement or boring tool engagement is continuously supported to accurately center drill or bore a workpiece.

It is another object of the invention to provide a turning machine constructed in accordance with any of the foregoing objects that is provided with an infinitely variable speed drive mechanism for the spindle of the machine, and a gear change mechanism is provided for power driving the spindle longitudinally at predetermined and selected speeds for thread cutting.

It is another object of the invention to provide a turning machine wherein the work stock is moved longitudinally with respect to the work tools, the work tools being movable radially with respect to the work stock, whereby a contoured workpiece can be produced by the use of a simple template form.

Another object of the invention is to provide a turning machine that is hand-operated wherein the work stock is moved longitudinally with respect to the work tools that are in a fixed relationship with respect to one another and radially movable with respect to the work stock so that forward turning, back turning, depth cutting, and cut-off can be accomplished by the use of two work tools, or more if desired.

It is another object of the invention to provide an apparatus for the work tools of the foregoing object for adjusting the cutting edges of the work tools so that the cutting edge of the forward turning tool will be diametrically opposite to the cutting edge of the cut-off and back turning tool.

Further objects and advantages will become apparent from the drawings and the following description.

In the drawings:

Fig. 6 is an end elevational view similar to Fig. 4 showing an overhead tool for special turning work upon the work stock.

Fig. 7 is a transverse cross-sectional view taken along line 7—7 of Fig. 6 showing the manner of adjusting the auxiliary work tool.

Figs. 11 and 12 show typical workpieces that can be produced upon the machine of this invention.

Figure 2:
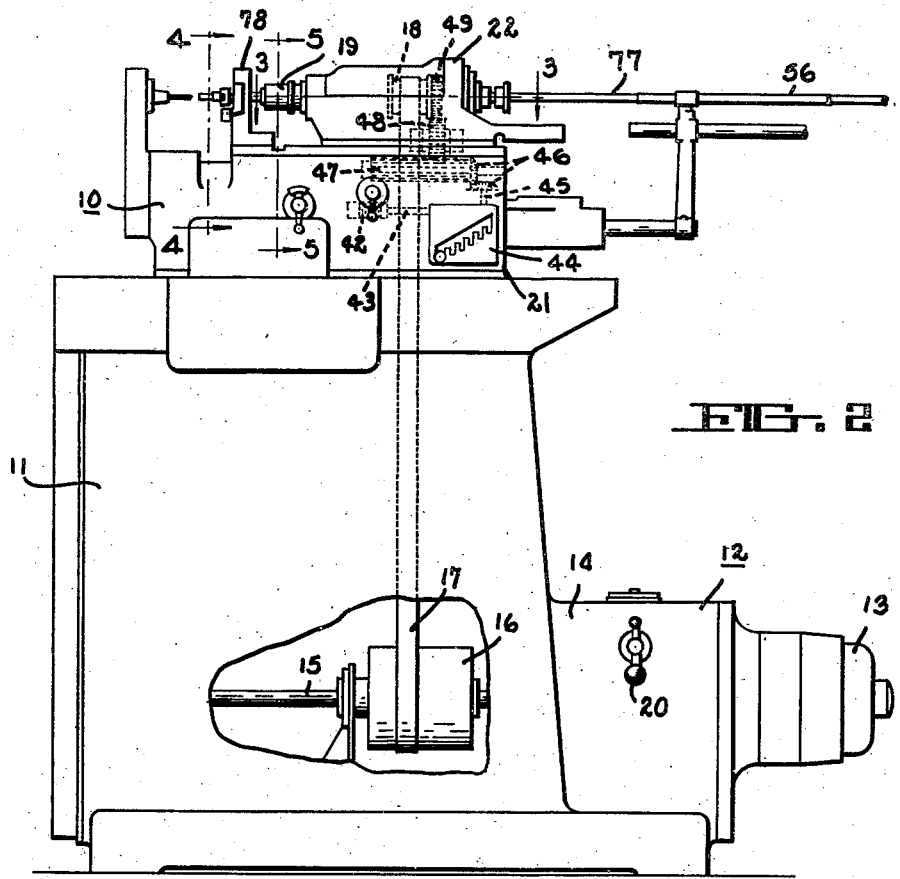
Fig. 2 is a side elevational view of the machine showing the hand-operated controls for the same.

The machine of this invention may be constructed as a bench model turning machine and be driven by a source of power that is not directly supported by or upon the machine, such as, an independent electric motor or through a line shaft drive or other similar power sources. The machine may also be designed as a floor model or base model machine wherein the power source for the machine is disposed within the base of the machine and thereby providing a unit structure. As shown in Fig. 2 the turning machine 10 is adapted to be mounted upon a base 11. The base 11 supports a variable speed drive unit 12 consisting of an electric motor 13 and a variable drive control unit 14. A drive shaft 15 extends from the variable speed unit 14 and carries a pulley 16 having a belt 17 extending over the drive pulley 18 on the spindle 19 of the turning machine 10. A control handle 20 is provided on the variable speed drive unit 14 for changing the speed ratio between the electric motor 13 and the drive shaft 15. This variable speed drive unit 14 may consist of a pair of cone pulleys having a drive member therebetween movable over the surface of the cone pulleys to infinitely vary the speed ratio therebetween or it can be constructed and arranged in any number of different ways. Variable speed drive units for changing the speed ratio between an input and output shaft are well-known articles of commerce, any one of which will satisfy the requirements of this invention for changing the speed of rotation of the pulley 16 and thus the spindle 19.

The turning machine 10 consists of a frame or base 21 that is adapted to be secured upon the base 11 or be supported upon a suitable bench or table. A spindle housing 22 is slidably mounted upon the base 21 by means of a wedge shaped tongue 23 adapted to slide in a wedge shaped groove provided in the base 21. An adjustable gib 25 is provided between the groove 24 and the tongue 23 to take up play therebetween.

The spindle housing 22 is provided with a depending ear within the hollow interior 27 of the base 21 and is adapted to extend therein through a groove 28. The ear 26 is threaded to receive a lead screw 29 that is suitably supported within the base 27 and has a worm wheel 30 upon one end thereof. The worm wheel engages a worm 31 supported upon a shaft 32 extending transversely of the base 27.

The shaft 32 supports a clutch member 33 slidably mounted upon and keyed thereto by means of a pin 34 extending through a slot 35. The clutch member 33 is adapted to engage the clutch face 36 of the worm 31 or the clutch face 37 of the worm wheel 38. The pin 34 extends through an inner shaft 39 provided within the shaft 32, the shaft 39 extending outwardly beyond the shaft 32 and through a control handle or dial 40 provided on the shaft 32. The inner shaft 39 is adapted to be shifted longitudinally within the shaft 32 to change position of the clutch member 33 between the clutch faces 36 and 37. A spring pressed ball detent 41 is provided within the base 21 and is adapted to engage recess portions in the shaft 39 to position the clutch member 33 in either of its engaged positions.

The worm wheel 38 engages a worm 42 that is carried upon a shaft 43 extending from a gear change box 44 (see Fig. 2). The gear change box 44 is provided with a drive shaft 45 that is driven by a pair of beveled gears 46 from an elongated spur gear member 47 suitably bearinged within the base 21 of the machine 10. A spur gear 48 engages the gear 47 and a gear 49 disposed upon the pulley 18 of the spindle 19, thereby, driving the gear change box 44 from the spindle 19 of the machine 10 for thread cutting in a manner to be hereinafter described.

It will thus be seen that the clutch member 33 may be shifted between the power driven worm wheel 38 and the hand driven worm 31 for providing power movement to the spindle housing 22 or hand movement, as selected by the position of the clutch member 33.

The spindle within the spindle housing 22 consists of a hollow shaft 50 that is bearinged in one end of the spindle housing 22 by means of the self-centering preloaded ball bearing 51. The shaft 50 is bearinged in the opposite end of the spindle housing 22 by means of a sleeve bearing 52 carried within a sleeve 53 extending from the housing 22. The shaft 50 is prevented from end play by means of the preloaded ball bearing 51. The spindle pulley 18 is carried upon the shaft 50 and is suitably keyed thereto by means of the key member 54, one end of the pulley 18 providing the gear 49. The shaft 50 is provided with an internal bore 55 through which the work stocks extends from a supply tube support 56 (see Fig. 2) through a collet 57 provided adjacent the sleeve bearing 52. The collet 57 is split longitudinally and is disposed within a tube 58 that is slidably positioned within the bore 55 of the shaft 50. The tube 58 is provided with a flange 59 adapted to engage the end of the shaft 50 to limit its travel. The collet 57 has a flanged end 60 disposed between the tapered inner surface of the flange 59 on the tube 58 and a sleeve 61 threaded upon the end of the shaft 50 and surrounding the flange 59 of the tube 58.

A spring 62 is provided between the tube 58 and a sleeve 63 slidable within the bore 55 of the tube 50 and having one end adjacent slots 64 provided in the shaft 50. Arms 65 are pivotally secured to the sleeve 66 carried by the shaft 50 by means of the pins 67. These arms 65 have inwardly directed ears 68 adapted to engage the end of the tube 63, and forwardly extending arms 69 adapted to ride upon the tapered surfaces 70 provided upon the sleeve 71 positioned upon the shaft 50.

The sleeve 71 provides the inner race of a ball bearing surrounding the shaft 50, the outer race 72 being engaged by a yoke 73 operated in a forward and rearward direction by means of a hand lever 75 extending from the spindle housing 22.

Figure 1:
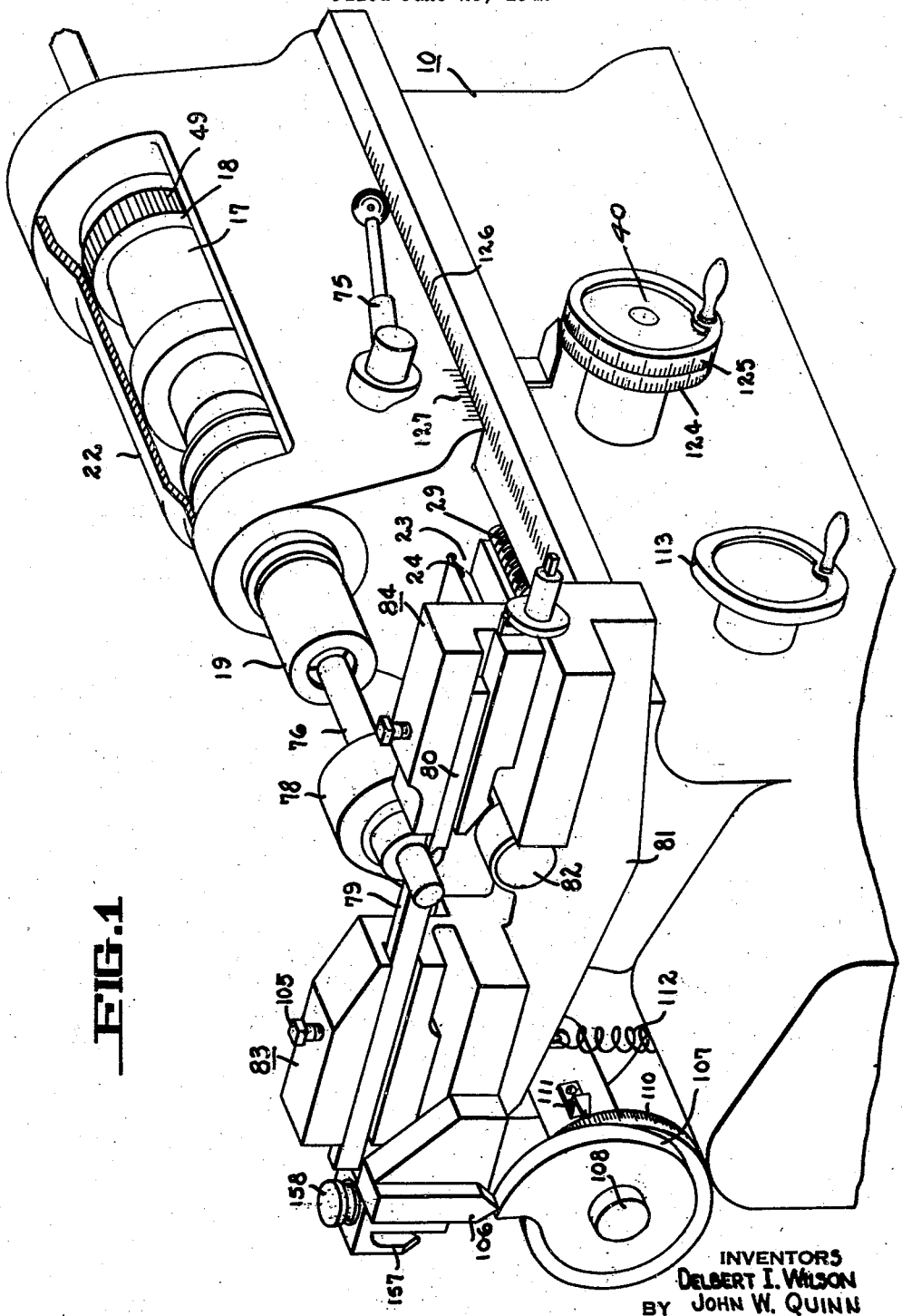
Fig. 1 is a perspective elevational view somewhat schematic of the machine of this invention.
Figure 3:
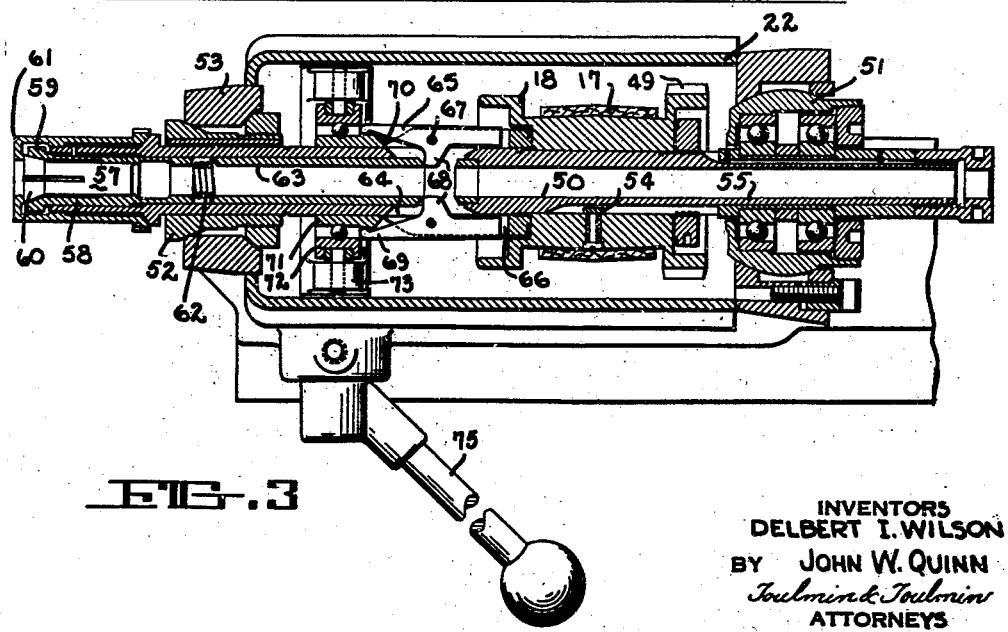
Fig. 3 is a longitudinal horizontal cross-sectional view of the spindle of the machine taken along line 3—3 of Fig. 2.

Movement of the hand lever 75 in a forward direction moves the sleeve 71 in a leftward direction to permit the arms 69 to ride down upon the tapered surfaces 70 and thus release the sleeve 63 to permit release of the spring 62 upon the tube 58 and thus release the frictional engagement of the collet 57 upon the work stock extending therethrough so that the stock can be advanced as desired. Return of the hand lever 75 into the position shown in Figs. 1 and 3 clamps the collet 57 upon the work stock to drive the stock rotationally and to move the same forwardly with respect to the work tools of the machine when the spindle housing 22 is moved by means of the hand-operated lever 40 or the power worm wheel 38.

A guide bushing 76 that may be either revolving or stationary, is provided within the guide bushing support 78 secured to the base 21 forwardly of the spindle 19. The guide bushing 76 is of the proper diameter to receive the work stock 77 and is in close fitting relationship therewith to prevent chatter of the work stock in the guide bushing 76 or in the guide bushing support 78. Since the work stock is frictionally secured within the collet 57 within the spindle 19, it will be moved through the guide bushing 76 when the spindle housing 22 is advanced by means of the hand wheel 40, which may also be power fed if desired. The guide bushing 76 thus provides a permanent support for the work stock that continuously supports the work stock during all turning operations.

The turning tools 79 and 80 are carried upon a rocker arm 81 that is pivoted to the guide bushing support housing 78 by means of a pivot pin 82. The rocker arm 81 has a tool support 83 that carries one of the turning tools 79, which in this instance is a cut-off and a back turning tool. The work tool 80 is a forward turning tool and is carried by the tool support 84. The tool support 84 is constructed and arranged so that the cutting edge of the work tool 80 can be accurately adjusted radially with respect to the axis of the spindle 19 and longitudinally with respect to the cutting edge of the work tool 79 so that the forward cutting edge of the work tool 80 is diametrically opposite the rearward cutting edge of the work tool 79, whereby radial adjustment of either work tool 79 or 80 will produce a turning operation at exactly the same radial point.

Figure 8:
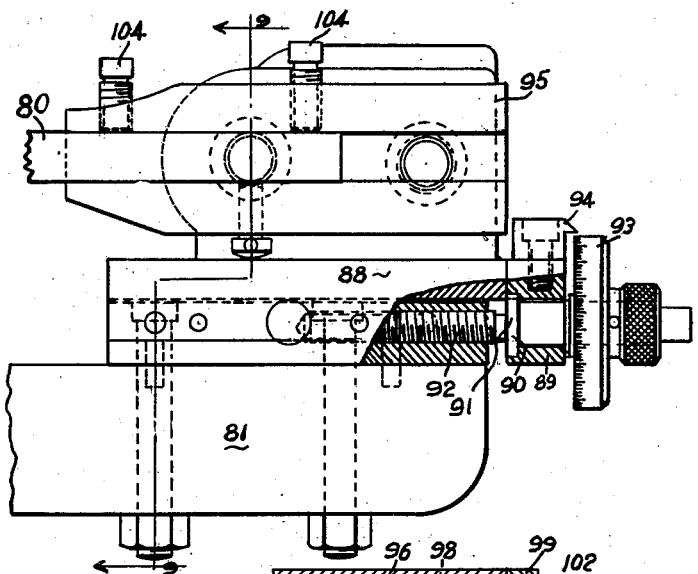
Fig. 8 is an enlarged elevational view partly in cross-section, showing the radial adjustment for one of the work tools.
Figure 9:
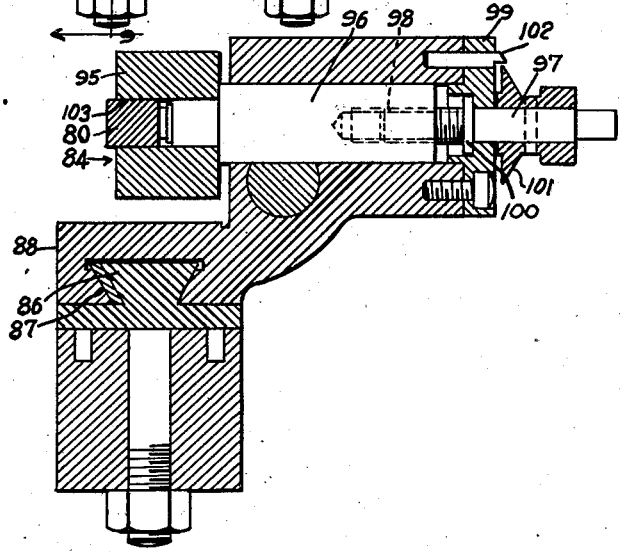
Fig. 9 is a cross-sectional view taken along line 9—9 of Fig. 8 showing adjustment of the work tool for longitudinally positioning the same with respect to the opposite work tool.
Figure 10:
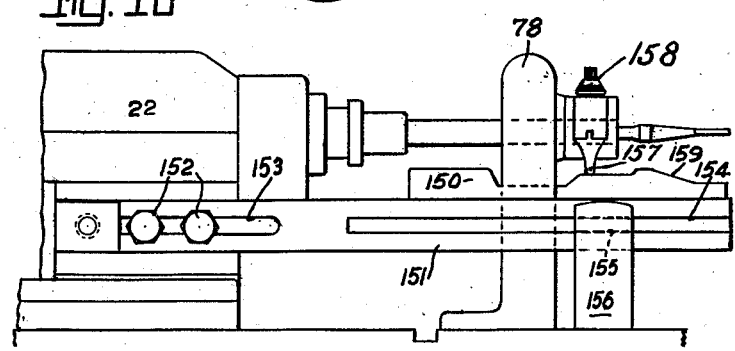
Fig. 10 is an elevational view of the side of the machine showing the manner by which a workpiece can be produced from a template.

The tool support 84 is disclosed in Figs. 8, 9 and 10. The tool support consists of a base member 85 that is provided with a wedge shaped tongue 86 slidable within a wedge shaped groove 87 provided in the tool carriage 88 of the tool support 84. The carriage 88 is provided with an overhanging and depending ear 89 in alignment with the tongue 86. A threaded screw member 91 extends through the ear 89 and is freely rotatable therein, but is prevented from axial movement within the ear 89 by means of suitable collars 90. The screw threaded member 91 engages screw threads 92 provided in the tongue 86, whereby rotation of the member 91 will move the tool carriage 88 with respect to the base member 85, thereby changing its radial position with respect to the axis of the spindle 19. A suitable calibrated dial is provided upon the screw thread member 91 for indicating the position of the work tool radially with respect to the axis of the spindle. A pointer 94 is provided for reading the scale upon the dial 93.

The tool 80 is carried within a tool holder 95 that is provided with a shaft 96 supported within the carriage 88 and is disposed parallel to the axis of the spindle 19 so that movement of the shaft 96 will move the tool holder 95 longitudinally of the axis of the spindle 19 and parallel therewith. Means is provided for moving the shaft 96 and consists of a screw threaded member 97 in threaded engagement with the shaft 96 as shown at 98. The screw threaded member 97 extends through a plate 99 secured to the tool carriage 88 and is prevented from axial movement by the collar 100. A calibrated dial 101 is provided for indicating the tool holder 95 and a pointer 102 is provided for reading the dial 101. The tool 80 is carried within the slot 103 in the tool holder 95 and is secured therein by means of the set screws 104.

The tool 79 is carried within the tool holder 83 which may be a stationary tool holder wherein the tool holder 79 is manually adjusted radially with respect to the axis of the spindle 19 and secured in position in the tool holder 83 by means of the set screw 105.

To set the tools 79 and 80 for proper cooperation and turning operations upon the work stock 77, the work tool 79 may first be manually adjusted with respect to the work stock 77 and an initial cut made to determine the exact diameter at which the cutting edge of the tool 79 is set. The tool 80 is then fastened in the tool holder 95 and the tool carriage 88 is adjusted radially by means of the screw thread member 91 to position the cutting edge of the tool 80 at precisely the same radial distance from the axis of the work stock 77 as the cutting edge of the work tool 79. As previously mentioned the work tool 79 is a cut-off and back turning tool, and the turning tool 80 is a forward turning tool. Therefore, the rear cutting edge of the turning tool 79 must be placed diametrically opposite of the forward cutting edge of the turning tool 80 so that when the turning tool 80 completes a forward cut the rearward cutting edge of the cut-off tool 79 will engage the work stock 77 at precisely the point at which the forward edge of the turning tool 80 stopped its forward turning to permit the workpiece to be cut off at a precise length.

Therefore, the tool holder 95 for the turning tool 80 is adjusted longitudinally by means of the screw thread member 97 to place the forward edge of the cutting tool 80 precisely opposite the rearward cutting edge of the work tool 79. Suitable means is provided for locking the screw thread members 91 and 97 in place after the adjustment has been made to prevent any alteration in the position of the tool 80 with respect to the tool 79.

The work tools 79 and 80 are moved radially with respect to the work stock 77 to produce depth cuts and thus obtain various turned diameters. The work stock 77 is moved longitudinally with respect to the work tools 79 and 80 to produce longitudinal turning thereupon at any particular depth at which either tool 79 or 80 is set. To control the depth of position of the turning tools 79 and 80 the rocker arm 81 is provided with a cam follower 106 secured to one end of the rocker arm 81. The cam follower 106 engages the surface of a constant rise cam 107 carried upon a cam shaft 108 and secured thereto by a suitable means such as the set screw 109. The surface of the cam 107 has been generated as a constant rise surface so that the rise of the surface of the cam will be a predetermined amount for each degree of rotation of the cam. Therefore, if each degree of rotation of the cam 107 causes a predetermined rise of the cam follower 106, the turning tools 79 and 80 will be moved radially toward or away from the axis of the work stock 77 a determined dimension for each degree of rotation of the cam 107. A dial 110 can therefore cooperate with the cam 107 and be rotated therewith, the dial being calibrated in equal increments, each increment representing a determined dimension of radial travel of the work tools 79 and 80 toward the axis of the work stock 77. Therefore, the dial can be calibrated in inches or preferably in thousands of an inch and can be read directly by means of a pointer 111.

Depending upon the direction of rotation of the constant rise cam 107, one or the other work tools 79 or 80 will engage the work stock 77. If the cam 107 is rotated in a clockwise direction as viewed in Fig. 4, the work tool 79 will be moved radially into the work stock 77, while if the cam is rotated in a counterclockwise direction the work tool 80 will be moved radially into the work stock 77, the cam follower 106 causing the rocker arm 81 to pivot about the pin 82 and thus move the work tools 79 and 80. A spring 112 has one end thereof secured to a suitable stationary support upon the base 21 and the opposite end thereof secured to the rocker arm 81 to insure engagement of the cam follower 106 upon the surface of the cam 107.

Figure 4:
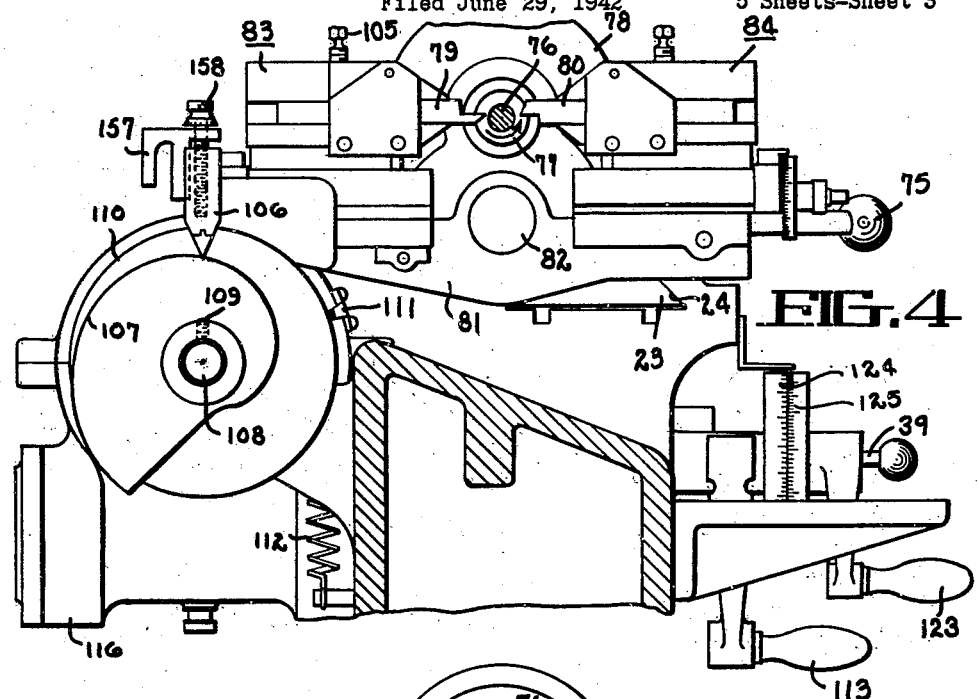
Fig. 4 is an end elevational view having the machine frame in cross-section and showing the work tools of the machine and is taken along line 4—4 of Fig. 2.
Figure 5:
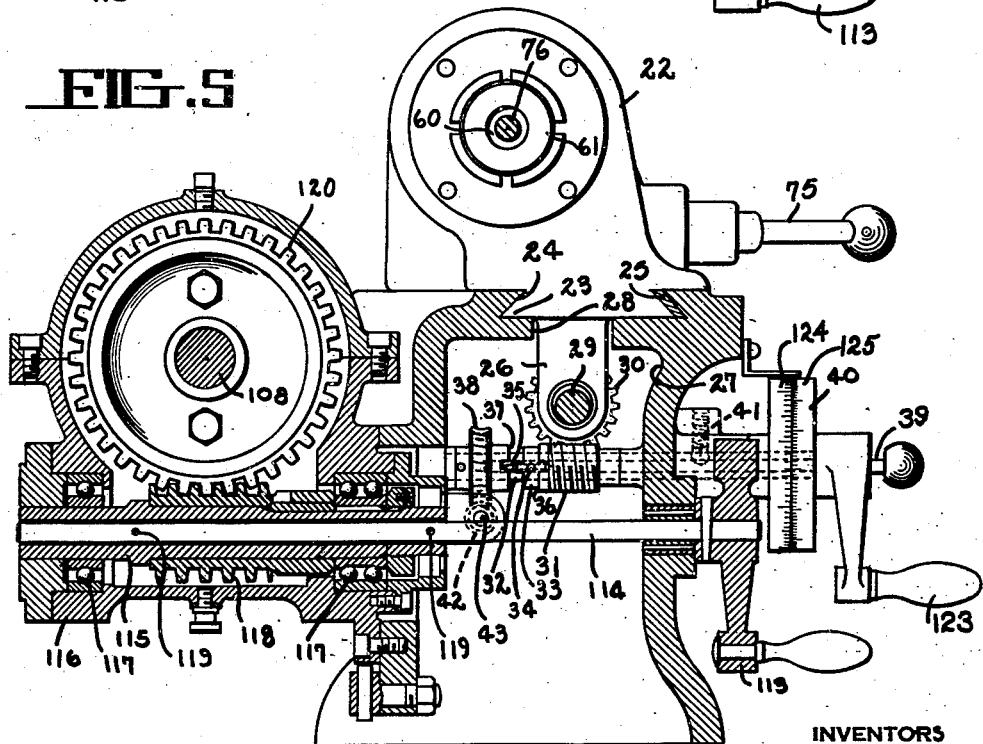
Fig. 5 is a transverse cross-sectional view taken along line 5—5 of Fig. 2 showing the hand-operated controls for the machine.

The torque reaction of rotation of the work stock 77 in a counterclockwise direction as indicated in Fig. 4 is such that when the work tool 79 engages the work stock 77, the rocker arm 81 is urged rotationally about the pivot 82 in a counterclockwise direction thereby tending to retain the cam follower 106 upon the cam 107. While if the work tool 80 engages the work stock 77 the force reaction caused by engagement of the cutting tool with the work stock is such that there is a tendency for the work tool to be lifted in a vertical direction and thus tend to rotate the rocker arm 81 about the pivot 82 and again retain the cam follower 106 in engagement with the surface of the cam 107.

The cam 107 is rotated manually by means of a hand wheel 113 carried upon a shaft 114. The shaft 114. The shaft 114 extends within a hollow shaft 115 suitably bearinged in a casing 116 secured to the base 21. The ball bearings 117 support the shaft 115 which carries a worm 118. The shaft 114 is pinned to the shaft 115 by means of pins 119 extending through the respective shafts. The worm 118 engages a worm wheel 120 secured to the cam shaft 108 by any suitable means. Therefore, rotation of the hand wheel 113 produces rotation of the constant rise cam 107. The operator of the machine can read the degree of movement of the work tools 79 and 80 direct from the dial 110 that is rotated with the cam 107. If desired the dial can be calibrated in both directions from a zero position so that the radial position of either of the tools is indicated. Preferably, the dial 110 frictionally engages the cam shaft 108 for rotation therewith so that the dial 110 can be rotated with respect to the constant rise cam 107 when initially setting either of the work tools 79 or 80 adjacent the work stock 77. When either tool is positioned for an initial cut upon the work stock, the dial 110 can be rotated to place the zero mark adjacent the pointer 111, thereby permitting direct reading of the diameter being turned by the work tool.

The control handle or dial 40 for moving the spindle housing 22 longitudinally upon the base 21 is preferably constructed and arranged as a micrometer dial having the handle 123 for rotating the dials, the dial 124 being an "inch" dial, while the dial 125 is a "thousandths" dial, so that the longitudinal travel of the spindle housing 22 can be accurately controlled and, therefore, the longitudinal turning cuts made upon the work stock carried by the spindle can be accurately regulated. If desired an inch scale 126 can be placed on the base 21 and a vernier scale 127 can be placed upon the spindle housing 122 cooperating with the inch scale 126.

The hand wheel 113 may also be a micrometer dial having an inch dial and a thousandths dial in the same manner as the hand wheel 40.

The turning machine of this invention is particularly adaptable for producing workpieces of extreme accuracy and of any diameter up to the capacity of the guide bushing 76. Typical workpieces that can be produced on the turning machine of this invention are shown in Figs. 11 and 12. It will be noted that the workpiece shown in Fig. 11 has an extremely small diameter portion 121 and a large diameter portion 122. The large diameter portion may be substantially the external diameter of the work stock, while the diameter 121 may be extremely thin and long. A workpiece of this type, particularly when it is a small member, is extremely difficult to produce upon an ordinary turning machine that requires centering of the work stock, or requires that the work stock that is to be turned shall extend beyond the chuck for holding the stock. In the example shown in Fig. 11, the workpiece of the entire length of the article would have to extend from the chuck of an ordinary turning machine and if the outer end was not centered to permit turning of the small diameter, difficulty would be had in maintaining concentricity of the small diameter portion 121 because of its extreme slimness.

The machine of this invention can accurately produce a workpiece as shown in Fig. 11 regardless of the slimness of the diameter of the portion 121 because the work stock is always supported immediately adjacent the point of engagement of the turning tool with the work stock. This point of engagement is maintained just as close as possible to the support bushing 76.

To produce an accurately dimensioned workpiece upon the machine of this invention the work stock 77 is clamped within the collet 57 of the spindle 19 by means of operation of the clamping handle 75. The turning tools 79 and 80 are then adjusted to the external diameter of the work stock in a manner heretofore described so that the cutting edge thereof is positioned like distances from the center of the work stock 77 and their cutting edges have been prepositioned for accurate transverse alignment in a manner heretofore described. The dial 110 for the constant rise cam 107 can then be set on zero position. The work stock is then advanced through the guide bushings 76 by rotation of the hand wheel 40, which may also be power fed if desired, until the forward turning tool 80 engages the work stock. The dials 124 and 125 on the hand wheel 40 can then be set to zero. The machine is now set for making any length of cut or any depth of cut upon the work stock 77 and the dimensions of each cut can be accurately determined by the dials 124 and 125 for length cut, and the dial 110 for depth cut. Since the spindle 19 drives the work stock 77 and advances the same through the guide bushing support, which continuously supports the full diameter of the work stock, it can readily be seen that a turning operation being performed upon the work stock immediately adjacent the guide bushing support will be an accurate turning operation because there can be no chatter or vibration of the work stock with respect to the work tool because the maximum diameter of the work stock is always being supported by the guide bushing 76.

After the small diameter portion 121 of the workpiece shown in Fig. 11 has been turned, the turning tool is backed off to the proper diameter for the second work portion 128 by means of the hand wheel 113 and the length thereof controlled by means of the hand wheel 40. These series of operations can be performed sequentially for producing the workpiece, moving the tools in and out, and moving the work stock forward until the completed article is formed. The cut-off tool 79 can then perform its operation, and if at any time back turning is required upon the workpiece the turning tool 79 is always available and the cutting edge thereof will always begin at the point left by the forward turning tool 80 so that there will be no loss of accuracy in the turning of the workpiece.

As previously mentioned the spindle housing 22 can be power driven in its forward motion by means of the worm 42 and the worm wheel 38 when the clutch 33 engages the worm wheel 38. In order to turn threads upon the work stock 77 the variable speed drive unit 12 is adjusted to produce the proper rotation of the work stock 77 depending upon the adjustment of the gear change box 44. The drive from the spindle 19 through the gear change box 44 to the lead screw 29 produces the proper forward motion of the spindle housing 22 that is proportioned to the speed of rotation of the spindle 19 so that threads of various types can be cut upon the work stock 77. It is, of course, understood that the work tool 80 is properly positioned with respect to the work stock 77 to produce the desired depth cut when turning threads upon the work stock.

There are times when it is desirable to feed the work stock in a forward motion at a constant rate to produce a high degree of surface finish upon the work stock. The power drive for the lead screw 29 provides for such forward power feeding of the spindle 19, as controlled by the setting of the gear change box 44. The feeding speed can be changed according to the type of metal that is being turned in the machine.

When manufacturing certain types of workpieces it may be necessary to produce a surface upon the article that cannot ordinarily be produced by a common turning tool of either the forward turning, cut-off or back turning types. At these times it would be desirable to provide means whereby a particular cut could be made upon a workpiece without altering the relationship of the cutting tools carried upon the turning machine. To provide for such an expediency, an auxiliary tool support 130, or supports, may be provided above the guide bushing support housing 78 as shown in Fig. 6. The tool 131 carried upon the tool support 130 may have any cutting face desired for producing a particular surface upon the article being manufactured. The tool is brought into engagement with the article by means of a manually operated handle 132, or it may be power driven if desired.

In detail the tool support 130 consists of a bracket 133 that may be detachably secured to the guide bushing support housing 78 by means of bolts 134. A guide member 135 is secured to the bracket 133 by means of a bolt 136. The guide 135 has a dovetail groove 137 therein adapted to receive an extending dovetail 138 provided on a tool carrier member 139 to permit the tool carrier to move vertically upon the guide member 135. The tool 131 is secured to the tool carrier by means of set screws 140. A plate 141 is secured to the tool carrier 139 and extends over the guide member 135 so that springs 142 extending from the guide member 135 can engage the plate 141 to constantly urge the same in an upward direction, whereby the tool 131 is held out of engagement with the work stock 77.

The handle 132 is pivoted upon an ear 143 carried upon the bracket 133 by means of a pin 144. The handle 132 has an arm 145 extending therefrom adapted to engage a stop 146 for limiting the downward movement of the tool 131. The precise travel of the tool 131 is regulated by means of a vernier control member 147 in threaded engagement with the handle 132 and in engagement with the plate 141. A locking screw 148 is provided for the vernier control member 147.

It is to be understood that while the auxiliary tool has been shown and described as a turning tool yet other forms of tool means can be used, such as a cross drilling attachment, a slotting attachment and others. The location of the auxiliary tool can be adjusted with respect to the work stock in the same manner as the work tool 80 if it is desirable by merely providing a similar type of work tool mounting for the auxiliary work tool.

The machine of this invention is also capable of producing any contoured article by merely advancing the work stock with respect to the work tools. As shown in Fig. 10 a template 150 can be mounted adjacent the left side of the machine as viewed in Fig. 4. The template 150 may be carried upon an arm 151 extending from the spindle housing 22. The arm 151 is secured to the spindle housing 22 by means of bolts 152, extending through a slot 153 that is provided to permit longitudinal adjustment of the template support 151 with respect to the spindle housing 22. The template 150 is suitably secured upon the template support 151, and may be adjustable thereupon if desired. The template support 151 is provided with a groove 154 extending longitudinally thereof that is adapted to engage a guide 155 provided upon a guide bracket 156 disposed adjacent the guide bushing support housing 78 and adjacent the tool support 83.

A template follower 157 may be adjustably supported upon the cam follower 106, or can be supported directly upon the tool support 83. Screw thread means 158 is provided for vertically adjusting the template follower 157 with respect to the template surface 159. Movement of the template 150 causes the template follower 157 to move over the template surface 159 and thereby rock the work tools 79 and 80 with respect to the axis of the work stock 77 so that the form of the template is reproduced upon the work stock 77. Of course, it will be understood that the form of the template will not be exactly the form produced upon the work stock because the degree of vertical movement of the template follower 157 must be larger than the radial movement of the work tool to produce a given depth of cut by the work tool. The longitudinal or length cuts produced by the face of the template will equal the length of the cuts produced upon the workpiece because the template and the workpiece are advanced in unison. However, the contour of the template can readily be calculated to produce the desired depth of cut because there is a known ratio between the ratio of the template follower 157 and the cutting edges of the work tools 79 and 80.

While the form of the apparatus disclosed herein shows a preferred form of the machine, it is to be understood that the machine is capable of considerable mechanical alteration without departing from the spirit of the invention, and that all modifications that fall within the scope of the appended claims are intended to be included herein.

Having thus fully described our invention, what we claim as new and desire to secure by Letters Patent is:

1. In a turning machine the combination of, a rotatable spindle mechanism for engaging and driving work stock and movable axially of the spindle, a work stock guide support for supporting the work stock as fed therethrough by said spindle mechanism, a turning tool movable substantially radially with respect to the axis of the work stock, and a constant rise cam for moving said work tool.

2. In a turning machine the combination of, a spindle mechanism for engaging and driving work stock, a mechanism for moving the spindle of the spindle mechanism axially, a work tool support mechanism for moving a work tool carried thereby substantially radially with respect to said spindle and for holding the tool stationary with respect to longitudinal movement, and a constant rise cam for actuating said work tool support mechanism to move said work tool substantially radially with respect to the axis of said spindle.

3. In a turning machine the combination of, a spindle mechanism for engaging work stock and driving the same, mechanism for moving the spindle of the spindle mechanism axially calibrated distances, work tool support mechanism for moving a work tool substantially radial with respect to the axis of said spindle and for holding the work tool stationary longitudinally with respect to said spindle, and a constant rise cam for actuating said tool support mechanism to move the tool carried by the support substantially radial to the axis of the spindle and having mechanism associated therewith for rotating said cam in predetermined calculated increments.

4. A turning machine which consists of the combination of a spindle mechanism for engaging and driving work stock, mechanism for moving the spindle of said spindle mechanism axially in calibrated increments, a work stock guide support through which the work stock is advanced by said spindle mechanism, a tool support mechanism pivotally mounted adjacent the work stock guide support, and a constant rise cam having calibrated mechanism associated therewith for rotating said work tool about the pivot for the same a determined increment for each degree of rotation of said cam, to thereby move said work tool substantially radially with respect to the axis of the work stock being fed through said work stock guide support by said spindle mechanism.

5. A manually operated turning machine which includes the combination of, a spindle mechanism for engaging work stock and driving the same, a manually operated calibrated mechanism for moving the spindle of said spindle mechanism axially in calibrated increments of travel, a work stock guide support through which the work stock is fed by said spindle, a work tool support pivotally mounted adjacent said work stock guide support adapted to have turning tools mounted thereon for engaging work stock extending through said work stock guide support, and a manually operated constant rise cam having calibrated mechanism associated therewith for rotating said work tool support a predetermined increment for each increment of rotation of said cam.

6. In a turning machine the combination which includes a spindle mechanism for engaging work stock and driving the same, a work stock guide support, work tool support means disposed adjacent said work stock guide support and adapted to have tools disposed therein with the cutting edge thereof closely adjacent said work stock guide support, mechanism for axially moving said spindle with respect to work stock guide support to feed work stock therethrough and move the same longitudinally with respect to the work tools carried by said work tool support whereby longitudinal turning cuts are made upon work stock, and mechanism for supporting said work tool support for moving the work tool carried thereby radially with respect to the work stock, whereby depth cuts are made upon the work stock.

7. In a turning machine the combination which includes a spindle mechanism for engaging work stock and driving the same, a work stock guide support, work tool support means disposed adjacent said work stock guide support and adapted to have tools disposed therein with the cutting edge thereof closely adjacent said work stock guide support, mechanism for axially moving said spindle with respect to work stock guide support to feed work stock therethrough and move the same longitudinally with respect to the work tools carried by said work tool support whereby longitudinal turning cuts are made upon work stock, means pivotally supported adjacent said work stock guide support for supporting said tool support, and a constant rise cam for actuating said means to move said tool support substantially radially with respect to the axis of said work stock guide support a predetermined increment for each degree of rotation for said cam, whereby calibrated depth cuts are made upon work stock extending through said work stock guide support.

8. A hand-operated turning machine which includes the combination of, a spindle mechanism for engaging and driving work stock, a manually operable mechanism for moving said spindle mechanism axially having calibrated mechanism associated therewith for indicating the degree of movement of the spindle mechanism, a work stock guide support disposed adjacent said spindle mechanism through which the work stock is fed by said spindle mechanism, work tool support means disposed adjacent said work stock guide support adapted to receive turning tools for positioning the same closely adjacent said work stock guide support and having means for mounting the same to move the work tools carried thereby substantially radially to the work stock guide support and maintain the work tool stationary longitudinally, and a manually operable rotatable means for actuating said work tool support means to move the work tools carried thereby radially a determined increment for each degree of rotation of said rotatable means.

9. A hand-operated turning machine which includes the combination of, a spindle mechanism for engaging and driving work stock, a manually operated mechanism for moving said spindle mechanism axially having calibrated mechanism associated therewith for indicating the degree of movement of the spindle mechanism, a work stock guide support disposed adjacent said spindle mechanism through which the work stock is fed by said spindle mechanism, work tool support means disposed adjacent said work stock guide support adapted to receive turning tools for positioning the same closely adjacent said work stock guide support and having means for pivoting the same to move the work tools carried thereby substantially radially to the work stock guide support and maintain the work tool stationary longitudinally, a constant rise cam for actuating said work tool support means to move the work tools carried thereby radially a determined increment for each degree of rotation of said cam, and manually operated calibrated mechanism for actuating said constant rise cam and determining the degree of rotation thereof.

10. A hand-operated turning machine which includes the combination of, a spindle mechanism for engaging and driving work stock, a manually operated mechanism for moving said spindle mechanism axially having calibrated mechanism associated therewith for indicating the degree of movement of the spindle mechanism, a work stock guide support disposed adjacent said spindle mechanism through which the work stock is fed by said spindle mechanism, work tool support means disposed adjacent said work stock guide support adapted to receive turning tools for positioning the same closely adjacent said work stock guide support and having means for pivoting the same to move the work tools carried thereby substantially radially to the work stock guide support and maintain the work tool stationary longitudinally, a constant rise cam for actuating said work tool support means to move the work tools carried thereby radially a determined increment for each degree of rotation of said cam, and mechanism for adjusting one of said turning tools radially with respect to the other.

11. A hand-operated turning machine which includes the combination of, a spindle mechanism for engaging and driving work stock, a manually operated mechanism for moving said spindle mechanism axially having calibrated mechanism associated therewith for indicating the degree of movement of the spindle mechanism, a work stock guide support disposed adjacent said spindle mechanism through which the work stock is fed by said spindle mechanism, work tool support means disposed adjacent said work stock guide support adapted to receive turning tools for positioning the same closely adjacent said work stock guide support having means for pivoting the same to move the work tools carried thereby substantially radially to the work stock guide support and maintain the work tool stationary longitudinally, a manually operable rotatable means for actuating said work tool support means to move the work tools carried thereby radially a determined increment for each degree of rotation of said rotatable means, mechanism for adjusting one of said turning tools radially with respect to the other, and mechanism for adjusting the adjustable tool longitudinally with respect to the other tool to position the cutting limits of the edges of the cutting tools diametrically radial with respect to one another.

12. A hand-operated turning machine which includes the combination of, a spindle mechanism for engaging and driving work stock, a manually operated mechanism for moving said spindle mechanism axially having calibrated mechanism associated therewith for indicating the degree of movement of the spindle mechanism, a work stock guide support disposed adjacent said spindle mechanism through which the work stock is fed by said spindle mechanism, work tool support means disposed adjacent said work stock guide support adapted to receive turning tools for positioning the same closely adjacent said work stock guide support having means for pivoting the same to move the work tools carried thereby substantially radially to the work stock guide support and maintain the work tool stationary longitudinally, variable speed power means for driving said spindle and a gear change mechanism drivingly connecting said spindle with the mechanism for axially moving the same to power drive the axial movement of said spindle.

13. In a hand-operated turning machine the combination of a spindle mechanism for engaging and driving work stock, manually operated means for moving said spindle mechanism axially, work stock guide support means disposed adjacent said spindle mechanism through which work stock is fed by said spindle mechanism, work tool support means disposed adjacent said work stock guide support having means to receive tools thereon that are adapted to be moved substantially radial to the axis of work stock, template means carried by said spindle mechanism for movement therewith, and means on said work tool support means for engaging said template to guide the work tool carried by the work tool support in a predetermined pattern.

14. In a hand-operated turning machine the combination of a spindle mechanism for engaging and driving work stock, manually operated means for moving said spindle mechanism axially, work stock guide support means disposed adjacent said spindle mechanism through which work stock is fed by said spindle mechanism, work tool support means pivotally mounted adjacent said work stock guide support having means to receive work tools and adapted to rock the work tools substantially radial to the axis of the work stock extending through the work stock guide support, a template carried by said spindle mechanism for movement therewith, and means on said tool support for engaging said template to rock said tool support in a predetermined pattern determined by said template.

15. In a hand-operated turning machine the combination of a spindle mechanism for engaging and driving work stock, manually operated means for moving said spindle mechanism axially, work stock guide support means disposed adjacent said spindle mechanism through which work stock is fed by said spindle mechanism, work tool support means pivotally mounted adjacent said work stock guide support having means to receive work tools and adapted to rock the work tools substantially radial to the axis of the work stock extending through the work stock guide support, a template carried by said spindle mechanism for movement therewith, means on said tool support for engaging said template to rock said tool support in a predetermined pattern determined by said template, said template having portions thereon for determining length turning that are equal to the length of the turned portion on the article being produced thereon, and depth turning control portions thereon that are greater than the depth of the portion turned on the article and maintained in a predetermined ratio to control the depth of the turned portions on the article.

16. In a turning machine the combination of a rotatable spindle mechanism for engaging and driving work stock and movable axially of the spindle, a work stock guide support for supporting the work stock as fed therethrough by said spindle mechanism, a turning tool movable substantially radially with respect to the axis of the work stock, and rotatable means for moving said work tool a determined transverse distance for each degree of rotation thereof.

17. In a turning machine the combination of, a spindle mechanism for engaging work stock and driving the same, mechanism for moving the spindle of the spindle mechanism axially calibrated distances, work tool support mechanism for moving a work tool substantially radial with respect to the axis of said spindle and for holding the work tool stationary longitudinally with respect to said spindle, and rotatable means for moving said work tool a determined transverse distance for each degree of rotation thereof for actuating said tool support mechanism to move the tool carried by the support substantially radial to the axis of the spindle and having mechanism associated therewith for rotating said rotatable means in predetermined calculated increments.

DELBERT I. WILSON.
JOHN WESLEY QUINN.